United States Patent [19]
Bartels

[11] Patent Number: 4,554,737
[45] Date of Patent: Nov. 26, 1985

[54] NUTCRACKER

[76] Inventor: Willi Bartels, Horster Strasse 109, D-4505 Mönchen-Gladbach 2, Fed. Rep. of Germany

[21] Appl. No.: 604,313

[22] Filed: Apr. 26, 4984

[30] Foreign Application Priority Data

Apr. 26, 1983 [DE] Fed. Rep. of Germany ... 8312209[U]

[51] Int. Cl.$^4$ .............................................. A47J 43/26
[52] U.S. Cl. .................................... 30/120.3; 30/120.5
[58] Field of Search ................. 30/120.1, 120.2, 120.3, 30/120.4, 120.5; 99/568

[56] References Cited

U.S. PATENT DOCUMENTS

| | | | |
|---|---|---|---|
| 483,334 | 9/1892 | Wheeler | 30/120.5 |
| 1,268,484 | 6/1918 | Olasz | 30/120.4 |
| 1,357,472 | 11/1920 | Randall | 99/568 X |
| 1,698,620 | 1/1929 | Clark | 30/120.3 |
| 2,378,084 | 6/1945 | Jackson | 30/120.3 |
| 3,581,788 | 6/1971 | McCoy | 99/568 |

Primary Examiner—Jimmy C. Peters
Attorney, Agent, or Firm—Michael J. Striker

[57] ABSTRACT

A nutcracker having two lever arms having first ends, a hinge pin connecting the two lever arms to each other, a press cup having an open top and substantially plane press surfaces, and press jaws, each of which is disposed at the first ends of the two levers and has stop surfaces to limit the travel of the two lever arms, with an opening angle which is constant in the initial position of the nutcracker regardless of nut size.

11 Claims, 2 Drawing Figures

NUTCRACKER

BACKGROUND OF THE INVENTION

The present invention relates to a nutcracker. More particularly, it relates to a nutcracker utilizing a lever system or screw spindle to generate the force.

Nutcrackers of the above mentioned general type are known in the art.

In nutcrackers of the known type, force is transmitted by means of a lever system in the form of either one-armed or two-armed levers, although so called nut presses, in which a screw spindle is used to generate force, are also known. In each case, the nutcracker or nut press first has to be adjusted to the size of the nut to be borken open before the actual breaking open operation can be started. Both for adjustment and for breaking open, it is necessary or, in the latter case, advisable, to use both hands if the nutshells are to be prevented from flying around. Since, on the one hand, the handle lever travel constantly varies as a function of the nut size according to the initial position of the press jaws and, on the other hand, with an increasing handle-lever travel the amount of force exerted also increases because of a less favorable transmission ratio, force is generated in an uncontrolled manner during the breaking-open operation, especially where large nuts are concerned, thus, usually resulting in greater destruction of the nut kernel. In contrast to this, where small nuts are concerned, such as, for example hazelnuts, there is the possibility that they will not be grasped at all by the press jaws or that they can be broken open only under unfavorable conditions because of a shorter handle lever travel.

SUMMARY OF THE INVENTION

Accordingly, it is an object of the present invention to provide a nutcracker which avoids the disadvantages of the prior art.

More particularly, it is an object of the present invention to provide a nutcracker whose handling is simple and safe.

In keeping with these objects, and with others which will become apparent hereinafter, one feature of the present invention resides, briefly stated, in a nutcracker having two lever arms having first ends, a hinge pin connecting the two lever arms to each other, and a press cup having an open top and substantially plane press surfaces, wherein press jaws, each of which are disposed at the first ends of the two levers and have stop surfaces to limit the travel of the two lever arms and having an opening angle which is constant in the initial position of the nutcracker regardless of nut size.

When the nutcracker is designed in accordance with the present invention the nutcracker is always ready for use, since the nut introduced into the press cup purely as a result of gravity assumes a position in which the actual breaking-open operation can be started immediately without further readjustment of the press jaws. The initial position of the handle ends of the lever arms remains unchanged for any size of nut and has a distance between the handle ends which is suitable for the user's hand, therefore making it substantially simpler to operate the nutcracker with only one hand. At the same time, the transmission ratio of the lever system and therefore the force to be exerted match the size of the nut. For example, where smaller nuts are involved the transmission increases and the relative amount of force exerted is reduced. Furthermore, the working stroke of the press jaws is directly related to the size of the nut which is to be broken open and the shell elasticity of which usually increases with increasing size, and thus a greater working stroke may be necessary to break open the nut. Finally, the nut introduced into the press cup sits securely between the press surfaces in such a way that force is usually exerted off-center, thus resulting in an improved breaking-open effect in comparison with a central exertion of force which is again the rule in known nutcrackers.

In accordance with another feature of the present invention, the two lever arms have handles disposed at second ends which are disposed at opposite ends from the first ends of the two lever arms.

Still another feature of the present invention is that the opening angle of the press jaws is at least 25° in the initial position.

A further feature of the present invention is that the opening angle of the press jaws is 30° in the initial position.

Yet another feature of the present invention is that the press jaws form an angle and have bottoms which are disposed from each other a distance in the range of 10 to 20 mm.

Yet still another feature of the present invention is that the press jaws have a relative angular adjustability in the range of 10° to 20°.

Another feature of the present invention is that the press surfaces are roughened.

Still another feature of the present invention is that the press surfaces are provided with a friction covering.

Yet another object of the present invention is that the press jaws form an angle with the lever arms and the handle ends of the lever arms extend substantially horizontally.

Another feature of the present invention is that the press cup forms a housing having side walls and a closed bottom and the side walls are made as one piece with one of the press jaws.

Still another feature of the present invention is that the hinge pin of the lever arms is anchored in the side walls of the press cup housing.

Finally, still a further feature of the present invention is that the lever arms are spring loaded and the press cup housing has a stop for the other one of the press jaws.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
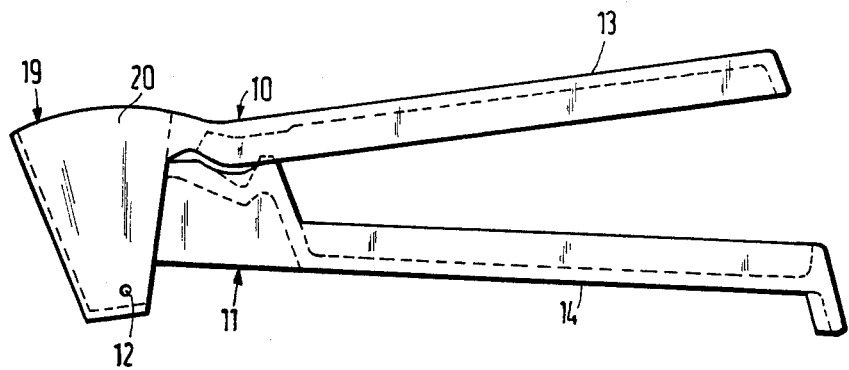
FIG. 1 is a side view of the nutcracker according to the present invention.
Figure 2:
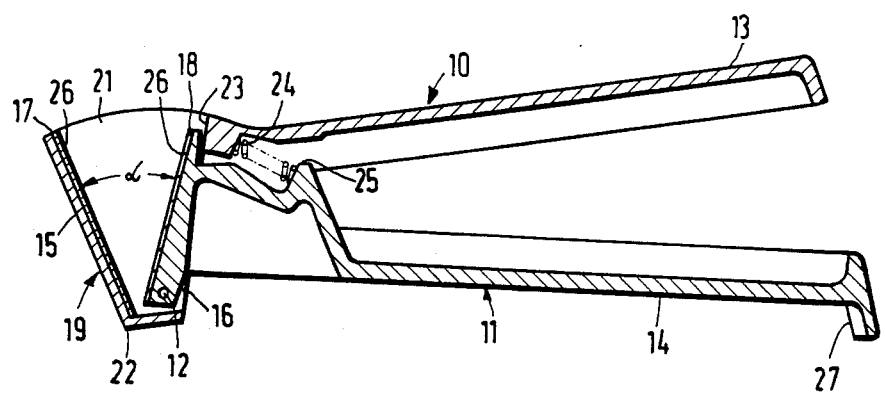
FIG. 2 is a longitudinal sectional view of the nutcracker of FIG. 1.

Referring now to FIG. 1, the nutcracker has two-armed levers 10 and 11 which are connected to one another in the form of double lever pliers via a hinge pin 12 and which extend with handle ends 13, 14 substantially horizontally. Preferably formed substantially at right angles on the ends of the lever arms 10, 11 facing away from the handle ends 13, 14 are press jaws 15, 16, having press surfaces 17, 18 respectively. The press surfaces 17, 18 are substantially plane and at the same time are part of a press cup 19 which is open at the top. The two press jaws 15, 16 form the front and rear end walls of the cup housing. Side walls 20, 21 and bottom 22 of the cup housing are preferably made in one piece with the front end wall (press jaw 15) and are therefore formed as with the lever arm 10 as one piece. The hinge pin 12 is anchored in the side walls 20, 21 near the bottom of the cup housing and it pivotably carries the press jaw 16 which is guided within the cup housing. The handle end 13 of the lever arm 10 forms, in the region of the press cup 19, a cross member 23 which connects the side walls 20, 21 of the cup housing. The cross member 23 also serves as a stop for the press law 16 in the rest position.

In the rest or initial position, the two press jaw 15, 16 form with their press surfaces 17, 18, respectively, an opening angle $\alpha$ of at least 25°, preferably 30°, and form an angle vertex open at the bottom, because the hinge pin 12 is located at a distance of 10 to 20 mm from the opposite press surface 17. The lever arms 10, 11 are loaded in the direction of the intital position by a compression spring 24 which is located in the immediate vicinity of the press cup 19 between the lever arms. The abutment provided for this purpose on the lever arm 11 is designed at the same time as a stop projection 25 to limit the lever travel. The resulting relative angular adjustability of the press jaws at the same time determines their working stroke, the amount of which depends on the predetermined distance between the press surfaces in the region of the open angle vertex and on the degree of the opening angle and which is appropriately limited to a value of between 10° and 20°. Moreover, the press surfaces 17, 18 are roughened or are provided with an appropriate friction covering 26, to prevent the nut from slipping during the breaking-open operation, for example because force is exerted off-center. The coefficient of friction $\mu$ can be between 0.5 and more than one depending on the nature of the nutshells.

So that the nutcracker can be placed on a plane base, a foot part 27 is formed on the end of the lever arm 11 on the same side as the handle, extends downward essentially at right angles and has a length that it forms, together with the bottom of the press cup 19, a resting surface. The nutcracker thus consists essentially of parts which can be produced, for example, by injection-molding.

Depending on the size of the nut, the lever transmission ratio of the nutcracker described above is between 1:4 and 1:7, so that cracking forces of up to 100 kgf, for example for hazelnuts, can be generated.

The same working principle can, of course, also be achieved for a nutcracker which is equipped merely with one-armed levers or in which the hinge pin is arranged in the lever plane and not offset to this. Finally, it will also be possible to replace the lever system by a screw spindle which moves one of the two press jaws.

It has proved appropriate, regarding nuts obtainable in the trade, for the press jaws to form in the initial position an opening angle of at least 25°, preferably 30° and the press jaws can form an angle vertex open at the bottom with a distance between them of 10 to 20 mm.

At the same time, the relative angular adjustability of the two press jaws can be between 10° and 20°, so that the nut kernel remains substantially undamaged when the shell is broken open.

To achieve an even more favorable transmission ratio with the same overall length, according to a further embodiment of the invention the press jaws can form an angle with the lever arms, the handle pieces of the lever arms preferably extending essentially horizontally.

So that the shells do not fall down out of the press cup during the breaking-open operation, the press cup can form a housing which is closed at the bottom. The bottom and side walls of the housing can be made in one piece with one of the two press jaws for reasons of stength. The hinge pin of the lever arm can then appropriately be anchored in the side walls of the housing.

So that the press jaws return automatically into their initial position after being actuated, the lever arms are spring-loaded in the direction of the initial position. The housing of the press cup is provided with a stop for the other press jaw.

It will be understood that each of the elements described above, or two or more together, may also find a useful application in other types of constructions differing from the types described above.

While the invention has been illustrated and described as embodied in a nutcracker, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications, without omitting features that, from the standpoint of prior art, fairly constitute essential characteristics of the generic or specific aspects of this invention.

What is claimed as new and desired to be protected by Letters Patent is set forth in the appended claims.

I claim:

1. A nutcracker for cracking a nut and having an initial position, comprising:
   two lever arms having first and second ends;
   a hinge pin connecting said two lever arms to each other;
   press jaws, each of which are disposed at said first ends of said two levers and have stop surfaces to limit the travel of said two lever arms, said press having an opening angle which is constant in the initial position of the nutcracker regardless of a nut size; and
   a press cup forming said press jaws and having an open top and substantially plane press surfaces, said press cup forming a housing having side walls and a closed bottom, said bottom and said side walls being made as one piece with one of said press jaws.

2. The nutcracker as defined in claim 1, wherein said lever arms are spring loaded and said press cup housing has a stop for the other one of said press jaws.

3. The nutcracker as defined in claim 1, wherein said opening angle of said press jaws is at least 25° in the initial position.

4. The nutcracker as defined in claim 1, wherein said opening angle of said press jaws is 30° in the initial position.

5. The nutcracker as defined in claim 1, wherein said press jaws form an angle and have bottoms which are displaced from each other.

6. The nutcracker as defined in claim 1, wherein said press jaws have a relative angular adjustability in the range of 10° to 20°.

7. The nutcracker as defined in claim 1, wherein said press surfaces are roughened.

8. The nutcracker as defined in claim 1, wherein said press surfaces are provided with a friction covering.

9. The nutcracker as defined in claim 1, wherein said hinge pin of said lever arms is anchored in said side walls of said press cup housing.

10. The nutcracker as defined in claim 1, wherein said two lever arms have handles formed by said second ends disposed opposite to said first ends of said two lever arms.

11. The nutcracker as defined in claim 10, wherein said press jaws form an angle with said lever arms and said second ends of said lever arms which form said handles extend substantially horizontally.

* * * * *